C. C. SUNDERLAND.
ROPE SOCKET.
APPLICATION FILED JAN. 9, 1917.
1,250,525.
Patented Dec. 18, 1917.
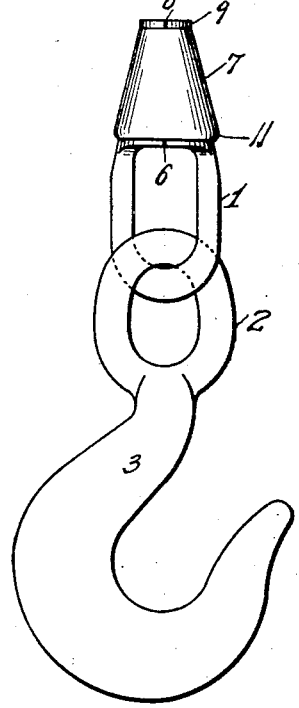
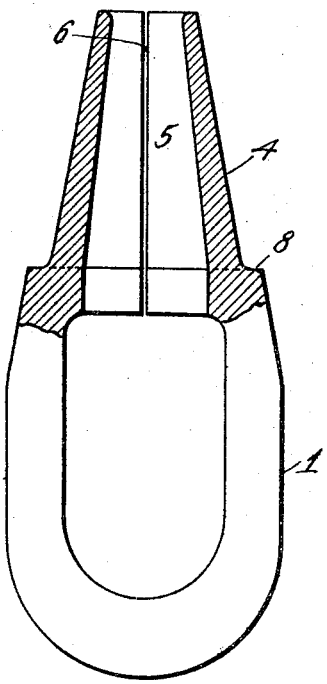
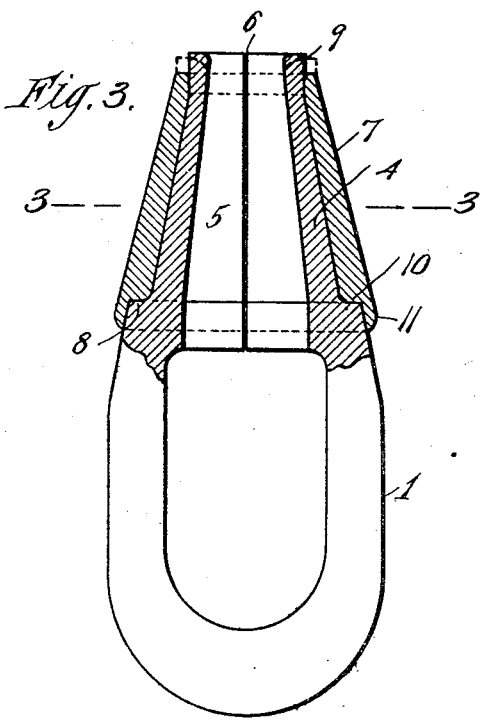
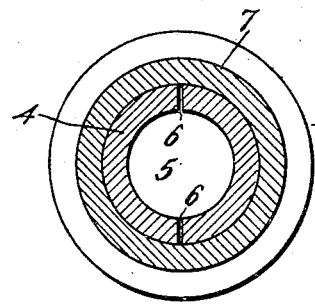
Inventor:
Charles C. Sunderland
by his Attys.

UNITED STATES PATENT OFFICE.

CHARLES C. SUNDERLAND, OF TRENTON, NEW JERSEY, ASSIGNOR TO JOHN A. ROEBLING'S SONS COMPANY, A CORPORATION OF NEW JERSEY.

ROPE-SOCKET.

1,250,525.                       Specification of Letters Patent.        Patented Dec. 18, 1917.

Application filed January 9, 1917. Serial No. 141,362.

*To all whom it may concern:*

Be it known that I, CHARLES C. SUNDERLAND, a citizen of the United States, residing at Trenton, county of Mercer, and State of New Jersey, have invented certain new and useful Improvements in Rope-Sockets, fully described and represented in the following specification and the accompanying drawings, forming a part of the same.

This invention relates to improvements in rope sockets used as connections between ropes or wire ropes and hooks, rings and the like.

One object of the invention is the provision of a socket connection in which the parts may be made of drop forgings, thereby eliminating all welding and welding operations.

The especial object of the invention is the production of a rope socket which may be readily connected to drop-forged hooks or the like having closed eyes, and in which, after connection, the parts are permanently secured together before the attachment of the rope end.

In the accompanying drawings forming a part of this specification, a rope socket embodying all the features of the invention in their preferred form, is shown and this construction will now be described in detail and the features forming the invention then specifically pointed out in the claims.

In the drawings—

Figure 1 is a side view of the socket connected to a drop-forged hook, or hook with eye forged from the solid, with the parts of the socket permanently secured together.

Fig. 2 is a side view, partly in section, showing the split basket and link.

Fig. 3 is a view similar to Fig. 2, showing the hollow cone in position on the basket previous to upsetting the end, and showing the upset position in dotted lines; and Fig. 4 is a section on the line 3—3 of Fig. 3.

Referring to the drawings—1 is the eye portion of the socket, shown in Fig. 1 as passed through closed eye 2 of drop-forged hook 3 and formed integrally with the socket basket 4, which is cone-shaped or tapering and split longitudinally of the rope passage 5 as at 6 and has a cone sleeve 7 fitted to the conical basket 4 which is provided with shoulders 8 and is made longer than the retaining cone 7, so that the end 9 projects beyond the cone sleeve 7, as shown in Figs. 1 and 3.

The retaining cone 7 is preferably turned from a solid bar of high grade steel and at the end abuts against shoulders 8 of the basket 4 preferably by shoulder 10 with lip 11 projecting outside the shoulder 10.

The method of securing the parts is as follows: After the basket 4 has been opened at the split 6 for connection of the hook, and the eye 1 of the latter slipped between the socket parts of the eye 2, the parts of the basket are closed together until they bear the one against the other, then the retaining cone 7 is fitted to the basket, preferably until the shoulder 10 is about a quarter of an inch from the shoulder 8. Then the cone is heated, forced to final position with shoulders 10 and 8 abutting, and shrunk upon the basket 4 in this position. After the retaining cone 7 is in place, the end lip 9 of the basket 4 is heated and upset against the end of the retaining cone 7, as shown in Fig. 1 and in dotted lines in Fig. 2.

The rope sockets are made up as articles of manufacture, the rope then passed through the basket into the socket eye, and secured in any suitable manner.

What is claimed is:—

1. A rope socket comprising a split basket, a hollow cone securing said split basket in closed position and lips on the basket upset against the smaller end of the cone to hold the cone in position.

2. A rope socket comprising a split basket, a hollow cone shrunk on said basket, and lips on the basket upset against the smaller end of the cone.

3. The combination with a rope socket having a closed eye, a split basket carrying the eye and a sleeve shrunk upon the basket to secure the basket in closed position, whereby a closed eye may be slipped through the open basket, of a hook or similar member having a closed eye engaging the socket eye.

4. A rope socket having the closed eye 1, split conical basket 4 carrying the eye, and cone sleeve 7 shrunk on the basket and secured by upsetting the ends of the basket.

In testimony whereof, I have hereunto set my hand.

CHARLES C. SUNDERLAND.